US008494851B2

(12) United States Patent
DeLuca et al.

(10) Patent No.: US 8,494,851 B2
(45) Date of Patent: Jul. 23, 2013

(54) SYSTEM AND METHOD FOR CONTEXTUAL SOCIAL NETWORK COMMUNICATIONS DURING PHONE CONVERSATION

(75) Inventors: Lisa Seacat DeLuca, San Francisco, CA (US); Pamela Ann Nesbitt, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/880,795

(22) Filed: Sep. 13, 2010

(65) Prior Publication Data

US 2012/0065969 A1    Mar. 15, 2012

(51) Int. Cl.
*G10L 15/26*    (2006.01)
*G10L 15/00*    (2006.01)
*G10L 15/04*    (2006.01)

(52) U.S. Cl.
USPC ............................ 704/235; 704/231; 704/251

(58) Field of Classification Search
USPC .................................. 704/231–257, 270–276
See application file for complete search history.

(56) References Cited

U.S. PATENT DOCUMENTS

| | | | |
|---|---|---|---|
| 7,478,094 B2 | 1/2009 | Ho et al. | |
| 7,702,693 B1 | 4/2010 | Aiyagari et al. | |
| 7,991,770 B2 * | 8/2011 | Covell et al. | 707/722 |
| 7,996,229 B2 * | 8/2011 | Da Palma et al. | 704/270.1 |
| 8,051,130 B2 * | 11/2011 | Logan et al. | 709/204 |
| 2004/0008828 A1 * | 1/2004 | Coles et al. | 379/88.01 |
| 2007/0067334 A1 | 3/2007 | Durbin | |
| 2008/0167015 A1 | 7/2008 | Vishwanathan et al. | |
| 2008/0240379 A1 | 10/2008 | Maislos et al. | |
| 2008/0262911 A1 * | 10/2008 | Altberg et al. | 705/14 |
| 2008/0275701 A1 * | 11/2008 | Wu et al. | 704/235 |
| 2009/0024710 A1 | 1/2009 | Danker et al. | |
| 2009/0029674 A1 * | 1/2009 | Brezina et al. | 455/405 |
| 2009/0086720 A1 | 4/2009 | Westlake | |
| 2009/0113342 A1 | 4/2009 | Bank et al. | |
| 2009/0136013 A1 | 5/2009 | Kuykendall et al. | |
| 2009/0285372 A1 | 11/2009 | Barton et al. | |

FOREIGN PATENT DOCUMENTS

| | | |
|---|---|---|
| EP | 2073517 A1 | 6/2009 |
| WO | WO 2010001182 A2 | 1/2010 |

OTHER PUBLICATIONS

Boland, Mike. "Yellix Dials in to Mobile Social Networking". Published Aug. 11, 2009 at http://blog.kelseygroup.com/index.php/2009/08/11/yellix-dials-in-to-mobile-social-networking.*
Eagle, N., et al., "Social Serendipity: Mobilizing Social Software," Pervasive Computing, IEEE, 2005.

(Continued)

*Primary Examiner* — Jesse Pullias
(74) *Attorney, Agent, or Firm* — Cahn & Samuels, LLP

(57) ABSTRACT

An embodiment of the invention includes methods and systems for contextual social network communications during a phone conversation. A telephone conversation between a first user and at least one second user is monitored. More specifically, a monitor identifies terms spoken by the first user and the second user during the telephone conversation. The terms spoken are translated into textual keywords by a translating module. One or more of the second user's web applications are searched by a processor for portion(s) of the second user's web applications that include at least one of the keywords. The processor also searches one or more of the first user's web applications for portion(s) of the first user's web applications that include at least one of the keywords. The portion(s) of the second user's web applications and the portion(s) of the first user's web applications are displayed to the first user during the telephone conversation.

25 Claims, 4 Drawing Sheets

OTHER PUBLICATIONS

Ilarri, S, et al., "Location-Dependent Query Processing: Where We Are and Where We Are Heading", ACM Computing Surveys, vol. 42, No. 3, Article 12, Mar. 2010.

Massaguer, D., et al., "Middleware for Pervasive Spaces: Balancing Privacy and Utility," 2009.

Melinger, D., "Privacy's Role in Mobile Social Software for the Urban Community," 1999-2000.

Puttaswamy, K., et al., "Preserving Privacy in Location-based Mobile Social Applications," HotMobile 2010, Feb. 22-23, 2010.

Shehab, et al., "Beyond User-to-User Access Control for Online Social Networks," ICICS 2008, LNCS 5308, pp. 174-189, 2008.

Help Us Nail Spammers, Twitter Blog, http://blog.twitter.com/2009/10/help-us-nail-spammers.html.

Trust and Safety, Twitter Blog, http://blog.twitter.com/2010/03/trust-and-safety.html.

\* cited by examiner

SYSTEM AND METHOD FOR CONTEXTUAL SOCIAL NETWORK COMMUNICATIONS DURING PHONE CONVERSATION

BACKGROUND

The present invention is in the field of methods, systems, and computer program products for contextual social network communications during a phone conversation.

The World Wide Web provides access to numerous social and business web applications (e.g., FACEBOOK®, MYSPACE®). Modern technological advances have made the Internet more accessible, at faster connection speeds. As a result, such web applications have become an increasingly popular means for people to communicate with their friends, family, and colleagues. For example, members of social networking sites are able to stay in touch with their friends and family by sharing and receiving photographs, videos, wall posts, comments and status updates.

SUMMARY OF THE INVENTION

An embodiment of the invention includes methods, systems, and computer program products for contextual social network communications during a phone conversation. A telephone conversation between a first user and at least one second user is monitored. More specifically, a monitor identifies terms spoken by the first user and the second user during the telephone conversation. The terms spoken are translated into textual keywords by a translating module. One or more of the second user's web applications are searched by a processor for portion(s) of the second user's web applications that include at least one of the keywords. The processor also searches one or more of the first user's web applications for portion(s) of the first user's web applications that include at least one of the keywords. The portion(s) of the second user's web applications and the portion(s) of the first user's web applications are displayed to the first user during the telephone conversation.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention mines relevant social networking sites for contextual information relevant to a current communication via telephone. The related social networking posts or interactions are then displayed to inform the speaker during the telephone conversation.

More specifically, at least one embodiment of the invention delivers contextual information associated with the topic of a telephone conversation to the user of the telephone, wherein the contextual information is derived from various social networking sites and personal web pages. The called party (also referred to herein as the "second user") is identified using pre-populated information or a telephone number lookup; and, contextually related information associated with the called party or topic of conversation is presented to the calling party (also referred to herein as the "first user"). The topic of the conversation is determined by parsing and performing speech to text transformation.

At least one embodiment of the invention utilizes a smartphone or a voice over internet protocol (VOIP) enabled computing device that parses a telephone call using speech-to-text translation mechanisms. The parsed text is used to search for relevant keywords and phrases on predefined social networking sites for the user. In one embodiment, the parsed text is matched with text from social networking sites pre-registered by the user, wherein the text from the social networking sites is flagged if matched text from the telephone call is spoken more than a predetermined number of times. For example, if the term "vacation" is spoken more than 3 times during the telephone conversation, then text from the user's social networking sites is flagged if it includes the term "vacation". Matched strings (with varying degrees of fuzziness) are popped up along with contextual information in order to guide the user during the telephone call.

Figure 1:
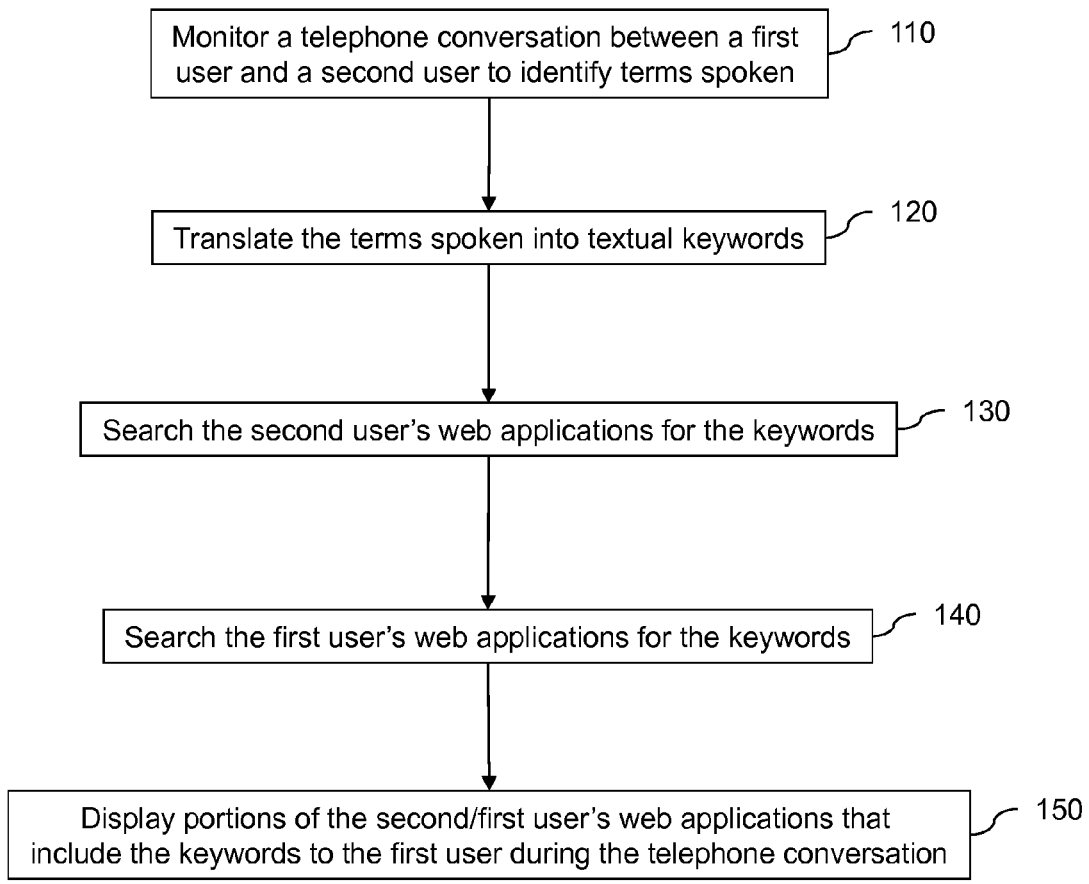
FIG. 1 is a flow diagram illustrating a method for contextual social network communications during a telephone conversation according to an embodiment of the invention.
Figure 2:
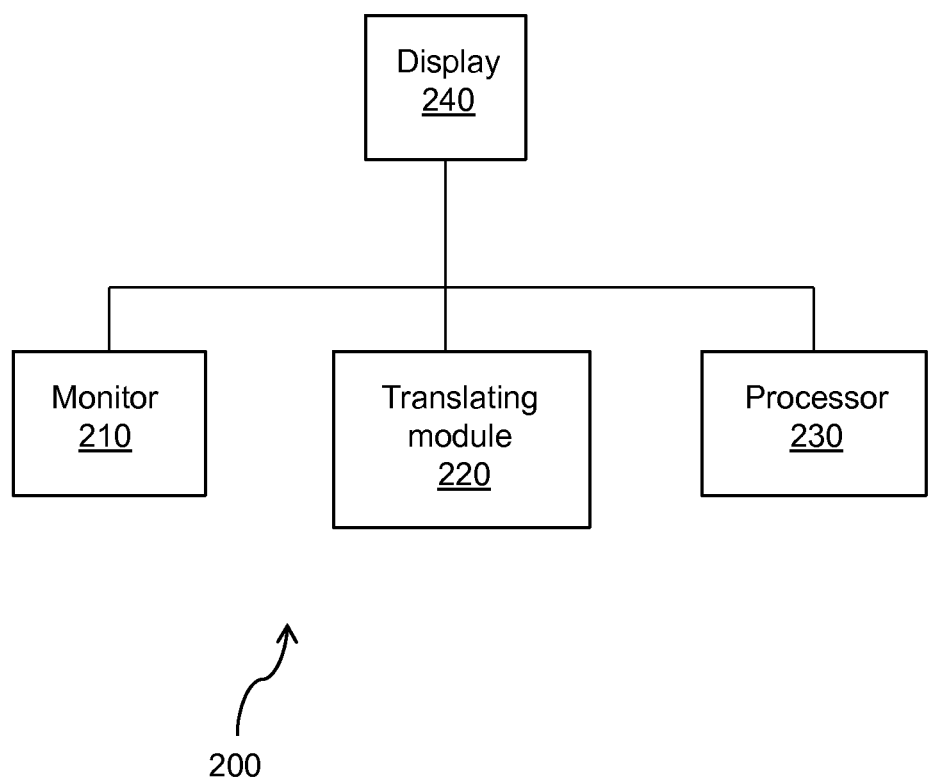
FIG. 2 illustrates a system for contextual social network communications during a telephone conversation according to an embodiment of the invention.

FIG. 1 is a flow diagram illustrating a method for contextual social network communications during a telephone conversation according to an embodiment of the invention. A telephone conversation between a first user and one or more second users is monitored to identify terms spoken by the first user and/or the second user(s) 110. FIG. 2 illustrates a system 200 for contextual social network communications during a telephone conversation according to an embodiment of the invention, wherein a monitor 210 is included to monitor the telephone conversation.

The monitor 210 identifies terms that are spoken by the first user and/or the second user a pre-determined number of times during the telephone conversation. For example, the system 200 includes default settings defined by the manufacturer to identify when a term is spoken by the second user more than once during the telephone conversation. In at least one embodiment, the monitor 210 identifies terms spoken by the first user and/or the second user a pre-determined number of times during a pre-determined time period during the telephone conversation. For example, the first user sets the system 200 to identify when a term is spoken by either the first user or the second user more than 5 times within a period of 10 minutes. In another embodiment, a term is identified if spoken by both the first user and the second user a pre-determined number of times during the telephone conversation.

A translating module 220 translates the terms spoken by the first user and/or the second user into textual keywords 120. In at least one embodiment, the translation is performed prior to identification of a term has been spoken by the first user and/or the second user a predetermined number of times, i.e., all of the spoken words are translated. In another embodiment, only the terms that are identified by the monitor 110 as being spoken a pre-determined number of times are translated.

A processor 230 searches at least one of the second user's web applications (e.g., social networking websites, personal websites, blogs) for at least one of the second user's web applications (e.g., a wall post) that includes at least one of the keywords 130. The portions of the second user's web applications include wall posts, status updates, comments, image captions, blogs, e-mail messages, and/or the second user's profile.

In at least one embodiment, the user registers all of the web applications for one or more contacts in his contact list, which are stored in memory. For example, the user registers John's FACEBOOK® account, Jane's MYSPACE® and LINKEDIN® account, and Jill's TWITTER® account and blog. When a telephone conversation is initiated between the user and John, the processor 230 identifies the John via caller ID if the telephone conversation was initiated by John, or via the telephone number entered by the user if the telephone conversation was initiated by the user. The processor 230 goes to the uniform resource locators (URL's) of John's pre-registered FACEBOOK® account to search for at least one of the keywords.

The web applications are searched to identify portions that include at least one of the keywords a predetermined number of times. In another embodiment, the web applications are searched to identify portions that include at least one of the keywords a predetermined number of times during a predetermined time period (e.g., John's FACEBOOK® account is searched to identify web pages that include the term "birthday" more than 10 times in the past week; John's FACEBOOK® wall is identified because it has 17 wall posts including the term "birthday" that were posted in the past 4 days). In yet another embodiment, the processor 230 searches the second user's web applications for stemmed keywords, wildcard versions of the keywords, and synonyms of the keywords.

For example, the processor 230 searches the second user's FACEBOOK® website, LINKEDIN® website, and personal blog for the term "weekend", and identifies 5 wall posts, 1 image captions, 10 comments, and 2 blog entries including the term "weekend". In another example, the processor 230 searches the second user's TWITTER® website based on the identified spoken term "seminar", and identifies 1 status update, 8 wall posts, and 4 comments including the terms "seminar", "seminars", "seminary", "conference", "symposium", "convention", "summit", and/or "meeting" from the past week (or other pre-determined time period).

In at least one embodiment of the invention, the processor 230 also searches at least one of the first user's web applications for at least one portion of the first user's web applications that includes at least one of the keywords 140. For example, the processor 230 searches the first user's MYSPACE® website and GMAIL® email account for the term "concert", and identifies 3 comments, 5 image captions, 2 MYSPACE® messages, and 10 GMAIL® e-mails including the term "concert". The portions of the second user's and/or first user's web applications (e.g., wall posts, comments, image captions, status updates, blog entries) are displayed to the first user during the telephone conversation 150 on a display 240. In at least one embodiment, the display 240 is on the telephone of the first user. In another embodiment, the display is a PC monitor or laptop computer connected to the telephone of the first user.

Figure 3:
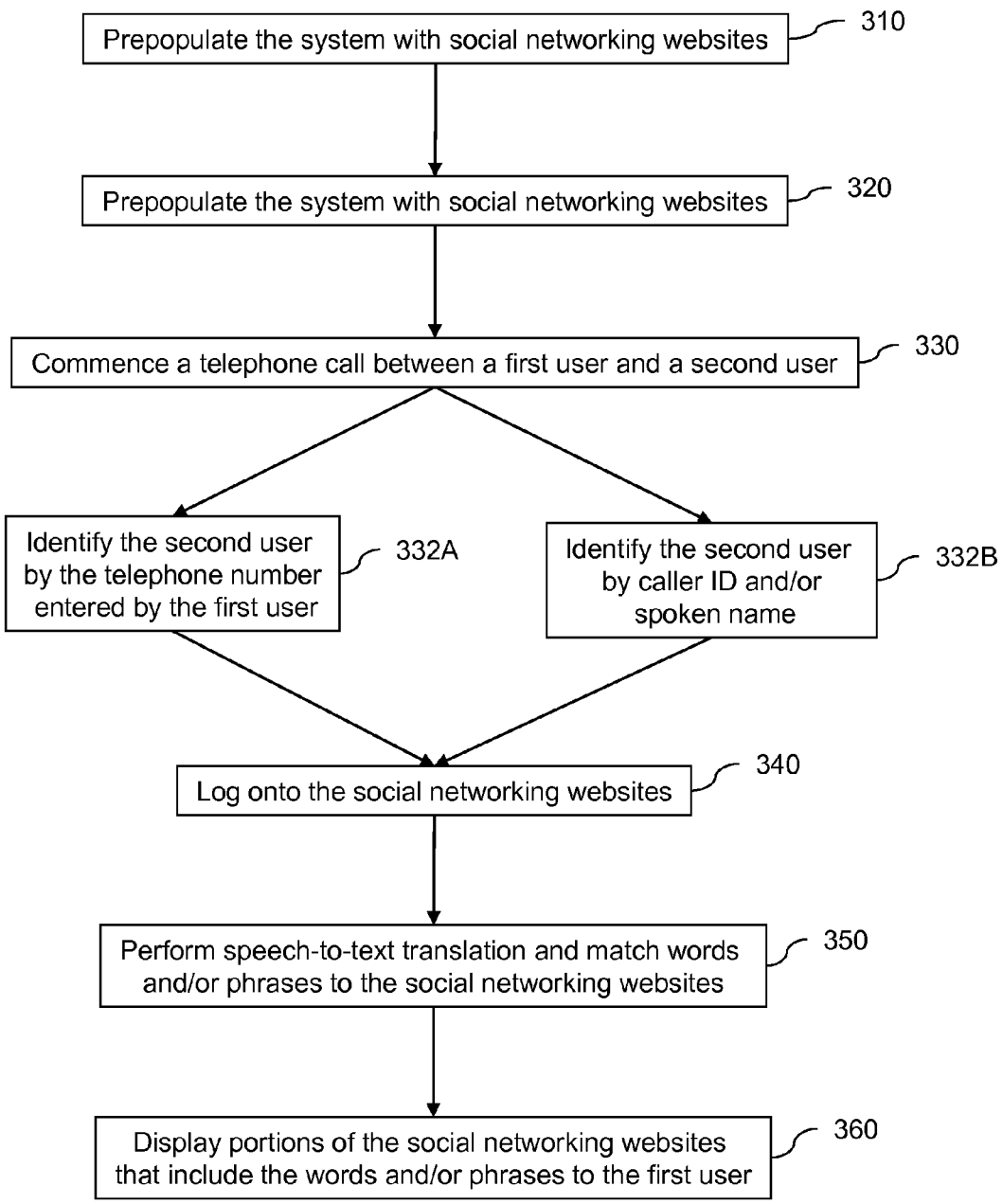
FIG. 3 is a flow diagram illustrating a method for contextual social network communications during a telephone conversation according to an embodiment of the invention.

FIG. 3 is a flow diagram illustrating a method for contextual social network communications during a telephone conversation according to an embodiment of the invention. A first user prepopulates the contextual social network communications system with his social networking websites (e.g., FACEBOOK®, MYSPACE®, numerous blogs) and/or social networking websites of his family and friends 310. The first user also prepopulates the system with selected words, phrases, and/or names 320, e.g., mom, Amanda, boyfriend, marriage/married/marry, job, money, fired, and/or anniversary.

In another embodiment, the contextual social network communications system automatically identifies the first user's social networking websites and the social networking websites of his family and friends, for example, by searching individual social networking websites for the first user and/or performing a full web search for the first user. Once a social networking website for the first user is located, the web pages on that social networking website for his family and friends can be identified. In yet another embodiment, the contextual social network communications system automatically identifies words, phrases, and/or names (keywords) on the identified social networking websites.

A telephone call commences between the first user and a second user 330. If the telephone call was initiated by the first user, the system identifies the second user by the telephone number entered by the first user 332A. If the telephone call was initiated by the second user, the identity of the second user is determined via caller identification of the incoming telephone number and/or voice recognition of the second user (e.g., "Hello, this is John") 332B.

The system logs onto the social networking websites prepopulated by the first user 340. During the telephone conversation, the system performs speech-to-text translation and matches words and/or phrases to the social networking websites prepopulated by the first user 350. For example, the second user says: "[d]id I tell you I broke up with my boyfriend?"; and, the system identifies five posts from the second user's FACEBOOK® wall regarding breaking up with her boyfriend and two comments posted by the first user in response to the posts. The system displays the portions of the social networking websites (e.g., the five posts and two comments) to the first user 360. Thus, the first user is given contextual information from the prepopulated social networking websites in order to inform him during the telephone conversation. Therefore, in the above example, the first user responds: "[y]eah, silly, I commented on your posts".

In another example, the system pops up the second user's blog which talks about her breakup. The first user had not read that blog but now sees it. Thus, in response to the second user's question "[d]id I tell you I broke up with my boyfriend?", the first user responds: "[n]o you didn't, but I read about it in your blog. I'm really sorry to hear it".

In yet another example, the second user says "[s]o how was your birthday? Sorry I couldn't make it, I was sick". The system pops up three tweets from User B and a photograph posted on the night of the first user's birthday showing that she went to a concert and was not sick.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
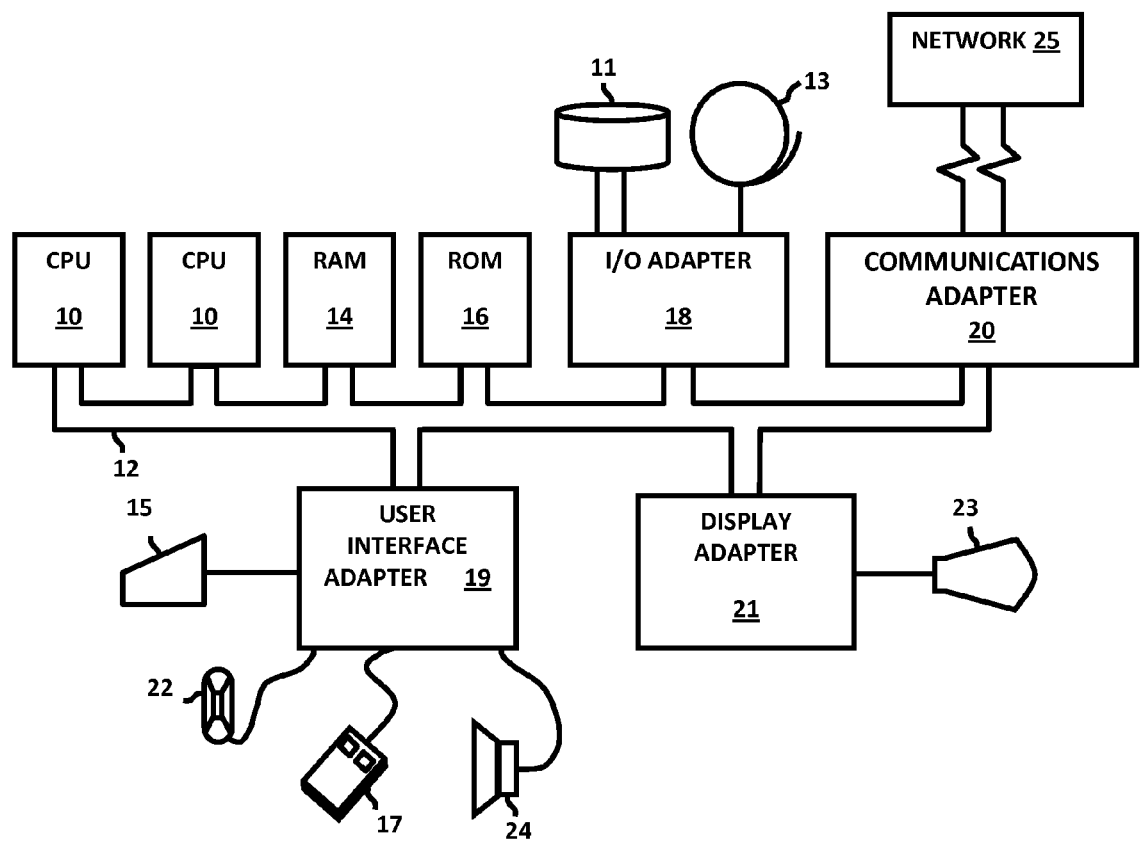
FIG. 4 illustrates a computer program product according to an embodiment of the invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method including:
    monitoring a telephone conversation between a first user and at least one second user to identify terms repeatedly spoken by at least one of the first user and the second user during the telephone conversation;
    translating the terms spoken into textual keywords;
    for each keyword, searching at least one of the second user's web applications for at least one portion of the second user's web applications that includes social network content created by the second user within a predetermined period of time and including the keyword, the at least one of the second user's web applications including a social networking website; and
    successively displaying, for each keyword, the portion of the second user's web applications including the keyword to the first user during the telephone conversation.

2. The method according to claim 1, wherein the portion of the second user's web applications includes at least one of wall posts, status updates, comments, image captions, blogs, e-mail messages, and the second user's profile.

3. The method according to claim 1, wherein said monitoring of the telephone conversation includes identifying terms spoken by at least one of the first user and the second user a pre-determined number of times during the telephone conversation.

4. The method according to claim 1, wherein said monitoring of the telephone conversation includes identifying terms spoken by at least one of the first user and the second user a pre-determined number of times during a pre-determined time period during the telephone conversation.

5. The method according to claim 1, wherein said searching of the second user's web applications includes identifying at least one portion of the second user's web applications that includes at least one of the keywords a predetermined number of times.

6. The method according to claim 1, wherein said searching of the second user's web applications includes identifying at least one portion of the second user's web applications that includes at least one of the keywords a predetermined number of times during a predetermined time period.

7. The method according to claim 1, wherein said searching of the second user's web applications includes searching for a stemmed keyword, a wildcard version of the keyword, and a synonym of the keyword.

8. The method according to claim 1, further including:
    searching at least one of the first user's web applications for at least one portion of the first user's web applications that includes at least one of the keywords; and
    displaying the portion of the first user's web applications to the first user during the telephone conversation.

9. The method according to claim 8, wherein the portion of the first user's web applications includes at least one of wall posts, status updates, comments, image captions, blogs, e-mail messages, and the first user's profile.

10. The method according to claim 8, wherein said searching of first second user's web applications includes identifying at least one portion of the first user's web applications that includes at least one of the keywords a predetermined number of times.

11. The method according to claim 8, wherein said searching of the first user's web applications includes identifying at least one portion of the first user's web applications that includes at least one of the keywords a predetermined number of times during a predetermined time period.

12. The method according to claim 8, wherein said searching of the first user's web applications includes searching for a stemmed keyword, a wildcard version of the keyword, and a synonym of the keyword.

13. A method including:
    monitoring a telephone conversation between a first user and at least one second user to identify terms repeatedly spoken by the first user and the second user during the telephone conversation;
    translating the terms spoken into textual keywords;
    for each keyword, searching at least one of the second user's web applications for at least one portion of the second user's web applications that includes social network content created by the second user within a predetermined period of time and including the keyword;
    searching at least one of the first user's web applications for at least one portion of the first user's web applications that includes at least one of the keywords, at least one of the at least one of the first user's web applications and the at least one of the second user's web applications include a social networking website; and
    successively displaying, for each keyword, at least one of the portion of the second user's web applications including the keyword and the portion of the first user's web applications to the first user during the telephone conversation.

14. The method according to claim 13, wherein said monitoring of the telephone conversation includes identifying terms spoken by at least one of the first user and the second user a pre-determined number of times during the telephone conversation.

15. The method according to claim 13, wherein said monitoring of the telephone conversation includes identifying terms spoken by at least one of the first user and the second user a pre-determined number of times during a pre-determined time period during the telephone conversation.

16. The method according to claim 13, wherein said searching of the first user's web applications includes identifying at least one portion of the first user's web applications that includes at least one of the keywords a predetermined number of times, and
    wherein said searching of the second user's web applications includes identifying at least one portion of the second user's web applications that includes at least one of the keywords a predetermined number of times.

17. The method according to claim 13, wherein said searching of the first user's web applications includes identifying at least one portion of the first user's web applications that includes at least one of the keywords a predetermined number of times during a predetermined time period, and wherein said searching of the second user's web applications includes identifying at least one portion of the second user's web applications that includes at least one of the keywords a predetermined number of times during a predetermined time period.

18. The method according to claim 13, wherein said searching of the first user's web applications includes searching for a stemmed keyword, a wildcard version of the keyword, and a synonym of the keyword, and wherein said searching of the second user's web applications includes searching for a stemmed keyword, a wildcard version of the keyword, and a synonym of the keyword.

19. A system including:
a monitor for identifying terms repeatedly spoken by at least one of a first user and a second user during a telephone conversation;
a translating module connected to said monitor for translating the terms spoken into textual keywords;
a processor connected to said translating module, said processor searches, for each keyword, at least one of the second user's web applications for at least one portion of the second user's web applications that includes social network content created by the second user within a predetermined period of time and including the keyword, said processor further searches at least one of the first user's web applications for at least one portion of the first user's web applications that includes at least one of the keywords, the at least one of the at least one of the second user's web applications and the at least one of the first user's web applications including a social networking website; and
a display for successively displaying, for each keyword, at least one of the portion of the second user's web applications including the keyword and the portion of the first user's web applications to the first user during the telephone conversation.

20. The system according to claim 19, wherein said monitor identifies terms spoken by at least one of the first user and the second user a pre-determined number of times during the telephone conversation.

21. The system according to claim 19, wherein said monitor identifies terms spoken by at least one of the first user and the second user a pre-determined number of times during a pre-determined time period during the telephone conversation.

22. The system according to claim 19, wherein said processor:
identifies at least one portion of the first user's web applications that includes at least one of the keywords a predetermined number of times, and
identifies at least one portion of the second user's web applications that includes at least one of the keywords a predetermined number of times.

23. The system according to claim 19, wherein said processor:
identifies at least one portion of the first user's web applications that includes at least one of the keywords a predetermined number of times during a predetermined time period, and
identifies at least one portion of the second user's web applications that includes at least one of the keywords a predetermined number of times during a predetermined time period.

24. The system according to claim 19, wherein said processor searches the first user's web applications and the second user's web applications for a stemmed keyword, a wildcard version of the keyword, and a synonym of the keyword.

25. A computer program product for communication within a system, said computer program product including:
a non-transitory computer readable storage medium;
first program instructions to monitor a telephone conversation between a first user and at least one second user to identify terms repeatedly spoken by the first user and the second user during the telephone conversation;
second program instructions to translate the terms spoken into textual keywords;
third program instructions to, for each keyword, search at least one of the second user's web applications for at least one portion of the second user's web applications that includes social network content created by the second user within a predetermined period of time and including the keyword;
fourth program instructions to search at least one of the first user's web applications for at least one portion of the first user's web applications that includes at least one of the keywords, at least one of the at least one of the first user's web applications and the at least one of the second user's web applications including a social networking website; and
fifth program instructions to successively display, for each keyword, at least one of the portion of the second user's web applications and the portion of the first user's web applications including the keyword to the first user during the telephone conversation,
said first program instructions, said second program instructions, said third program instructions, said fourth program instructions, and said fifth program instructions are stored on said computer readable storage medium.

* * * * *